United States Patent
Khosravi et al.

(10) Patent No.: US 9,887,838 B2
(45) Date of Patent: Feb. 6, 2018

(54) METHOD AND DEVICE FOR SECURE COMMUNICATIONS OVER A NETWORK USING A HARDWARE SECURITY ENGINE

(75) Inventors: Hormuzd M. Khosravi, Portland, OR (US); Edward C. Epp, Portland, OR (US); Farhana Kabir, Camas, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,412

(22) PCT Filed: Dec. 15, 2011

(86) PCT No.: PCT/US2011/065069
§ 371 (c)(1),
(2), (4) Date: Apr. 3, 2014

(87) PCT Pub. No.: WO2013/089725
PCT Pub. Date: Jun. 20, 2013

(65) Prior Publication Data
US 2015/0039890 A1     Feb. 5, 2015

(51) Int. Cl.
*H04L 9/08*      (2006.01)
*H04L 29/06*     (2006.01)

(52) U.S. Cl.
CPC .......... *H04L 9/0838* (2013.01); *H04L 9/0841* (2013.01); *H04L 9/0861* (2013.01); *H04L 63/061* (2013.01)

(58) Field of Classification Search
USPC ....................................................... 173/171
See application file for complete search history.

(56) References Cited

U.S. PATENT DOCUMENTS 5,657,390 A * 8/1997 Elgamal ................. H04L 29/06
                                                  713/151
6,324,288 B1   11/2001 Hoffman
(Continued)

FOREIGN PATENT DOCUMENTS

CN          101251879 B    10/2010
TW          201008309 A     2/2010
(Continued)

OTHER PUBLICATIONS http://www.inf.ufsc.br/~bosco.sobral/ensino/ine5680/material-cripto-seg/2014-1/Stallings/Stallings_Cryptography_and_Network_Security.pdf. pp.317-327 and 528-549 (Book was published Nov. 16, 2005).*

(Continued)

*Primary Examiner* — Farid Homayounmehr
*Assistant Examiner* — Thanh T Le
(74) *Attorney, Agent, or Firm* — Barnes & Thornburg LLP

(57) ABSTRACT

A method, device, and system for establishing a secure communication session with a server includes initiating a request for a secure communication session, such as a Secure Sockets Layer (SLL) communication session with a server using a nonce value generated in a security engine of a system-on-a-chip (SOC) of a client device. Additionally, a cryptographic key exchange is performed between the client and the server to generate a symmetric session key, which is stored in a secure storage of the security engine. The cryptographic key exchange may be, for example, a Rivest-Shamir-Adleman (RSA) key exchange or a Diffie-Hellman key exchange. Private keys and other data generated during the cryptographic key exchange may be generated and/or stored in the security engine.

24 Claims, 4 Drawing Sheets

(56) References Cited

U.S. PATENT DOCUMENTS

| | | | |
|---|---|---|---|
| 6,385,597 B1* | 5/2002 | Guenther | G06K 13/0825 705/402 |
| 6,401,208 B2 | 6/2002 | Davis | |
| 6,449,720 B1* | 9/2002 | Sprague | G06F 21/602 380/255 |
| 6,948,065 B2 | 9/2005 | Grawrock | |
| 7,069,352 B2* | 6/2006 | Pezzini | G06F 13/385 710/3 |
| 7,096,352 B2* | 8/2006 | Kang | H04L 63/0428 380/270 |
| 7,350,083 B2 | 3/2008 | Wells | |
| 7,356,671 B1* | 4/2008 | Wei | G06F 9/3851 712/35 |
| 7,366,306 B1* | 4/2008 | Trimberger | G06F 12/1425 326/8 |
| 7,382,882 B1* | 6/2008 | Immonen | H04L 63/0428 380/247 |
| 7,600,132 B1 | 10/2009 | Mahmoud | |
| 7,747,862 B2 | 6/2010 | Ovadia | |
| 7,802,085 B2 | 9/2010 | Graunke | |
| 7,813,822 B1 | 10/2010 | Hoffberg | |
| 7,966,646 B2* | 6/2011 | Chou | H04L 63/166 726/2 |
| 8,014,530 B2 | 9/2011 | Brickell | |
| 8,205,238 B2 | 6/2012 | Blumenthal et al. | |
| 8,295,484 B2 | 10/2012 | Buer et al. | |
| 8,296,581 B2* | 10/2012 | Jennings | G06F 9/3824 711/100 |
| 8,364,975 B2* | 1/2013 | Kumar | G06F 21/57 380/277 |
| 8,549,297 B1* | 10/2013 | Topham | G06F 21/80 380/278 |
| 8,571,221 B2* | 10/2013 | Little | G06F 21/72 380/255 |
| 8,615,787 B2* | 12/2013 | Murray | H04L 63/0853 380/281 |
| 8,627,440 B2* | 1/2014 | Mowers | H04L 63/0807 380/279 |
| 8,645,677 B2 | 2/2014 | Khosravi et al. | |
| 9,317,708 B2* | 4/2016 | Lee | G06F 21/6218 |
| 2002/0112161 A1 | 8/2002 | Thomas | |
| 2002/0163522 A1 | 11/2002 | Porter et al. | |
| 2003/0236970 A1 | 12/2003 | Palmer | |
| 2004/0158715 A1* | 8/2004 | Peyravian | H04L 9/0844 713/171 |
| 2004/0243823 A1 | 12/2004 | Moyer et al. | |
| 2005/0005093 A1* | 1/2005 | Bartels | G06F 21/606 713/150 |
| 2005/0114687 A1 | 5/2005 | Zimmer et al. | |
| 2005/0144436 A1 | 6/2005 | Chen | |
| 2005/0213766 A1* | 9/2005 | Goss | G06F 21/72 380/277 |
| 2005/0213768 A1 | 9/2005 | Durham et al. | |
| 2005/0289343 A1* | 12/2005 | Tahan | G06F 21/72 713/169 |
| 2006/0005011 A1 | 1/2006 | Satoh | |
| 2006/0041938 A1* | 2/2006 | Ali | G06Q 20/341 726/14 |
| 2006/0117177 A1* | 6/2006 | Buer | G06F 21/606 713/155 |
| 2006/0133604 A1 | 6/2006 | Buer et al. | |
| 2006/0174110 A1* | 8/2006 | Strom | G06F 21/10 713/165 |
| 2007/0094503 A1* | 4/2007 | Ramakrishna | H04L 9/0822 713/172 |
| 2007/0138229 A1 | 6/2007 | Fujimoto | |
| 2007/0156987 A1 | 7/2007 | Chen | |
| 2007/0192611 A1 | 8/2007 | Datta | |
| 2007/0209072 A1 | 9/2007 | Chen | |
| 2007/0240200 A1 | 10/2007 | Han | |
| 2008/0005586 A1 | 1/2008 | Munguia | |
| 2008/0022395 A1 | 1/2008 | Holtzman et al. | |
| 2008/0037793 A1 | 2/2008 | Buer | |
| 2008/0077809 A1 | 3/2008 | Hayler | |
| 2008/0148061 A1 | 6/2008 | Jin et al. | |
| 2008/0177998 A1 | 7/2008 | Apsangi et al. | |
| 2008/0229104 A1 | 9/2008 | Ju et al. | |
| 2008/0244267 A1* | 10/2008 | Zimmer | G06F 21/572 713/171 |
| 2008/0256363 A1 | 10/2008 | Balacheff | |
| 2009/0235090 A1* | 9/2009 | Chang | H04L 9/0825 713/190 |
| 2009/0280905 A1* | 11/2009 | Weisman | A63F 13/08 463/40 |
| 2009/0319804 A1 | 12/2009 | Qi | |
| 2010/0042824 A1* | 2/2010 | Lee | G06F 21/6218 713/2 |
| 2010/0042839 A1* | 2/2010 | Ho | H04L 9/0841 713/169 |
| 2010/0205443 A1* | 8/2010 | Zhao | H04L 9/0841 713/171 |
| 2010/0299525 A1 | 11/2010 | Shah et al. | |
| 2011/0023077 A1 | 1/2011 | Simon | |
| 2011/0154023 A1 | 6/2011 | Smith | |
| 2011/0154061 A1 | 6/2011 | Chilukuri et al. | |
| 2011/0161370 A1* | 6/2011 | Miyamae | G06F 17/30067 707/783 |
| 2011/0161645 A1 | 6/2011 | Zhang | |
| 2011/0231923 A1* | 9/2011 | Bollay | H04L 63/166 726/9 |
| 2011/0235806 A1* | 9/2011 | Fukuda | H04L 9/0825 380/282 |
| 2011/0289004 A1* | 11/2011 | Prakash | G06Q 20/20 705/71 |
| 2011/0302638 A1* | 12/2011 | Cha | G06F 21/57 726/6 |
| 2012/0079287 A1 | 3/2012 | Leclercq | |
| 2012/0137126 A1* | 5/2012 | Matsuoka | H04L 9/0838 713/156 |
| 2012/0137137 A1 | 5/2012 | Brickell et al. | |
| 2012/0257757 A1* | 10/2012 | Gessner | H04L 63/061 380/282 |
| 2013/0080764 A1 | 3/2013 | Khosravi et al. | |
| 2013/0275769 A1 | 10/2013 | Khosravi et al. | |
| 2013/0297936 A1 | 11/2013 | Khosravi | |
| 2014/0129827 A1 | 5/2014 | Khosravi et al. | |
| 2014/0270166 A1* | 9/2014 | Avanzi | H04L 9/0822 380/201 |

FOREIGN PATENT DOCUMENTS

| | | |
|---|---|---|
| TW | 201340692 A | 10/2013 |
| WO | WO00/02358 | 1/2000 |
| WO | 2011119985 | 9/2011 |
| WO | 2013089725 | 6/2013 |
| WO | 2013089725 A1 | 6/2013 |
| WO | 2013089726 A1 | 6/2013 |
| WO | 2013089728 A1 | 6/2013 |
| WO | 2014074127 A1 | 5/2014 |

OTHER PUBLICATIONS

International Preliminary Report on Patentability received for PCT International Application No. PCT/US2011/065069, dated Jun. 26, 2014, 8 pages.
International Search Report and Written Opinion received for International Application No. PCT/US2011/065069, dated Aug. 30, 2012, 11 pages.
"Transport Layer Security," Wikipedia, The Free Encyclopedia, available: [http://en.wikipedia.org/w/index.php?title=Transport_Layer_Security&oldid=464220022], edited Dec. 5, 2011, 19 pages.
"HTTP Secure," Wikipedia, The Free Encyclopedia, available: [http://en.wikipedia.org/w/index.php?title=HTTP_Secure &oldid=465003157], edited Dec. 9, 2011, 6 pages.
Bajikar, "Trusted Platform Module (TPM) based Security on Notebook PCs," White Paper, Jun. 20, 2002, 20 pages.
Intel Corp., "Product Brief: Intel® Atom™ Processor CE4100," 2009, 4 pages.

(56) References Cited

OTHER PUBLICATIONS

"Diffie-Hellman key exchange," Wikipedia, The Free Encyclopedia, available: <http://en.wikipedia.org/w/index.php?title=Diffie%E2%80%93Hellman_key_exchange&oldid=464229141>, accessed Dec. 8, 2011, 9 pages.
"Elliptic curve cryptography," Wikipedia, The Free Encyclopedia, available: <http://en.wikipedia.org/w/index.php?title=Elliptic_curve_cryptography&oldid=464634149>, accessed Dec. 8, 2011, 8 pages.
"Scrambler," Wikipedia, The Free Encyclopedia, available: <http://en.wikipedia.org/w/index.php?title=Scrambler&oldid=460036487>, accessed Dec. 8, 2011, 4 pages.
U.S. Appl. No. 13/694,221, filed Nov. 8, 2012, 50 pages.
Taiwanese Office Action issued in connection with Taiwanese Application No. 101147203, completed Dec. 29, 2014, 11 pages.
International Preliminary Report on Patentability received for PCT International Application No. PCT/US2011/065072, dated Jun. 26, 2014, 6 pages.
International Search Report and Written Opinion received for International Application No. PCT/US2011/065072, dated Jul. 18, 2012, 10 pages.
Platform Independent Overall Security architecture in multi-processor system-on-chip intergrated circuits for use in mobile phones and handheld devices. Ashkenazi et al. ElSevier (2007).
Data Security Architure using Embedded Chip. Thomas et al. IJCSNS (May 2011).
Scalable Architectural Support for Trusted Software. Champagne et al. IEEE (2009).
Secure Memory Accesses on Networks-on Chip. Fiorin et al. IEEE (2009).
Extended European Search Report issued in connection with European Application No. 11877254.0-1853, dated Jul. 17, 2015, 8 pages.
Hitachi, Ltd., "Digital Transmission Content Protection Specification Revision 1.7," Dec. 14, 2011, Retrieved from the Internet: URL: http://www.dtcp.com/documents/dtcp/info-20111214-dtcp-v1-rev-1-p-7.pdf (retrieved on Jul. 21, 2014), Chapter 4: Full Authentication and Chapter 6: Content Channel Management and Protection.
Intel Corp., Product Brief: Intel Atom Processor CE4100, 2009, p. 1-4.
Digital Transmission License Administrator, Digital Transmission Content Protection Specification, Mar. 19, 2010, vol. 1, p. 11, 26-29, and 36-38.
Broadcom, Aug. 24, 2011, What is BCM7309—Single-Chip Back-End Set-Top Decoder, http:// Web.archive.org/web/20110824145230/httP//www.broadcom.com/products/Cable/Cable-Set-Top-Box-Solutions/BCM7309.
First Office Action for Chinese Application No. 201180075550.4, dated Jun. 1, 2016, 5 pages.
Chinese Office Action for Patent Application No. 201180075550.4, dated Mar. 6, 2017.
Office Action, Search Report, and English Translation of R.O.C. Patent Application No. 101147511, dated Oct. 24, 2016, 11 pages.

* cited by examiner

METHOD AND DEVICE FOR SECURE COMMUNICATIONS OVER A NETWORK USING A HARDWARE SECURITY ENGINE

BACKGROUND

Cryptographic communication protocols are used to establish a secure communication session between computing devices over an untrusted network or communication link. One commonly used cryptographic communication protocol is the Secure Sockets Layer (SSL) protocol. The SSL protocol, and the related Transport Layer Security (TLS) protocol, is used for many different types of secure communication sessions including, for example, secure web-browsing, ecommerce, secure upgrades, and other secure communication sessions between two computing devices on an untrusted network such as the Internet. Other communication protocols may utilize the SSL/TLS protocol to provide the underlying security. For example, the Hypertext Transfer Protocol Secure (HTTPS) uses SSL/TLS for encryption of messages between devices. Typically, the cryptographic security offered by the SSL/TLS protocols is done so in-band and performed at the software application level.

Some computing and electronic devices utilize system-on-a-chip (SOC) designs due to their relatively small footprint. SOC devices are integrated circuits that incorporate various components, in addition to the processing core, of electronic systems on a single die. For example, an SOC may include a processor core, memory controller, video components, audio components, and/or communication components on a single chip.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
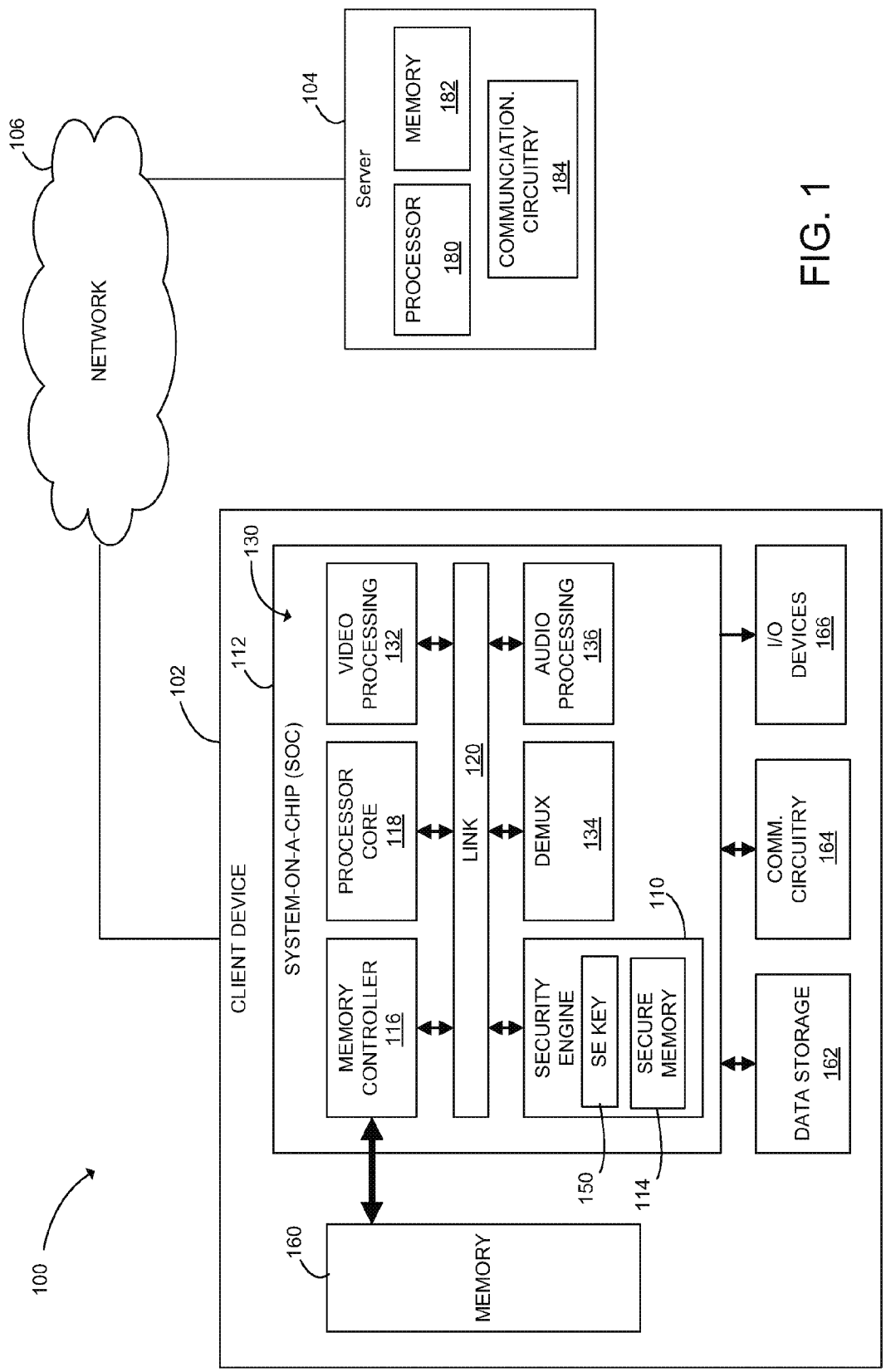
FIG. 1 is a simplified block diagram of at least one embodiment of a system for establishing a secure communication session between a client device having a system-on-a-chip (SOC) and a server over a network.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions carried by or stored on a machine-readable medium, which may be read and executed by one or more processors. A machine-readable medium may be embodied as any device, mechanism, or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others. In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments. In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, a system 100 for establishing a secure communication session includes a client device 102, a server 104, and a network 106. In operation, the client device 102 initiates a request for a secure communication session with the server 104 over the network 106. To establish the secure communication session, the client device 102 and the server 104 perform a cryptographic key exchange, such as a Diffie-Hellman or a Rivest-Shamir-Adleman (RSA) key exchange, to generate a secret symmetric session key. The secret symmetric session key may then be used to encrypt and decrypt messages between the client device 102 and the server 104. To ensure a secure communication session, the various keys and other cryptographic functions generated by the client device 102 are done so within a security engine 110 of a system-on-a chip (SOC) 112 of the client device 102. The client device 102 maintains the keys in secrecy within a secure memory 114 of the security engine 110. For example, the security engine 110 may include a security key 150, as discussed below, used to sign and/or otherwise encrypt other keys and messages. In this way, the client device 102 and server 104 may establish a secure communication session across the network 106 using out-of-band (i.e., not application level), hardware security features of the client device 102. In the illustrative embodiments described herein, the secure communication session is a Secure Sockets Layer (SSL) communication session, but the system 100 and features described herein may be used to establish other types of secure communication sessions in other embodiments. The client device 102 may be embodied as any type of computing device capable of communicating with the server 104 over the network 106. For example, the client device 102 may be embodied as a set-top box, a digital television, a smartphone, a tablet computer, a laptop computer, a mobile internee device (MID), a desktop computer, or other device capable of communicating with the server 104.

As discussed above, the client device 102 includes the SOC 112, which may be embodied as any type of system-on-a-chip device having various components and structures. In the illustrative embodiment of FIG. 1, the SOC 112 includes the security engine 110, a memory controller 116, a processor core 118, and a plurality of hardware peripherals 130, which are communicatively coupled to each other via a link 120. The link 120 may be embodied as any type of interconnect such as a bus, point-to-point, or other interconnect capable of facilitating communication between the various components of the SOC 112. The hardware peripherals 130 may include any type of hardware peripheral component depending upon the intended functionality of the SOC 112. For example, in the illustrative embodiment, the hardware peripherals 130 include a derma 132 to separate audio and video content streams, video processing component(s) 134 to process video content, and audio processing component(s) 136 to process audio content. Of course, it should be appreciated that the hardware peripherals 130 of the SOC 112 have been simplified in the illustrative embodiment of FIG. 1 and that the SOC 112 may include additional, different, and/or greater detailed hardware peripherals 130, which are not illustrated in FIG. 1 for clarity of the disclosure.

The security engine 110 may be embodied as a security co-processor or processing circuitry separate from the processor core 118. The security engine 110 includes the security key 150 and the secure memory 114, which is accessible only by the security engine 110. The security engine 110 stores the security key 150, and other cryptographic keys as discussed below, in the secure memory 114. In the illustrative embodiment, the security key 150 is provisioned during the manufacturing of the SOC 112, but may be generated by the SOC 112 during operation in other embodiments. For example, in some embodiments, the security key 150 is based on blown fuses within the security engine 110 itself. Additionally or alternatively, the security engine 110 may include a key-generating module, such as a trusted platform module (TPM), to generate the security key 150. During use, the security engine 110 may use any number of security keys 150, which may be identical or different from each other.

In some embodiments, the client device 102 may include additional components and structures other than the SOC 112 depending on the type and intended use of the client device 102. For example, in the illustrative embodiment of FIG. 1, the client device 102 includes a system memory 160, a data storage 162, a communications output 164, and one or more input/output devices 166. The system memory 160 may be embodied as any type of main memory or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices.

The data storage 162 may be embodied as any type of device or devices configured for the short-term or long-term storage of data such as, for example, memory devices and circuits, memory cards, hard disk drives, solid-state drives, or other data storage devices. The communications output 164 may be embodied as a simplified output or as various circuits and/or devices to facilitate, for example, communications with the server 104. For example, the communications output 164 (and/or communication circuitry within the SOC 112) may use any suitable communication protocol such as Ethernet (i.e. the IEEE 802.3 standard) or Wi-Fi® (i.e., the IEEE 802.11 standard), and/or other communication protocols or standards. Additionally, the input/output devices 166 may be embodied as any type of I/O device for interacting with the client device 102. For example, the I/O devices 166 may include output devices such as a display for displaying data on the client device 102, speakers for generating audio, and/or input devices such as a remote control receiver, a keyboard, a mouse, and/or the like.

The server 104 may be embodied as any type of data server capable of establishing a secure communication session with the client device 102. As such, the server 104 may include various hardware and software components typically found in a server for communicating, maintaining, and transferring data over a network. For example, the illustrative server 104 includes a processor 180, a memory 182, and communication circuitry 184, which may be similar to such components found in other data servers. For example, the processor 180 may be embodied as any type of processor capable of executing software/firmware, such as a microprocessor, digital signal processor, microcontroller, or the like, and may include one or more processing cores. The memory 182 may be embodied as any type of memory or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The communication circuitry 184 may be embodied any type of circuitry and/or device to facilitate, for example, communications with the client device 102. For example, the communication circuitry 184 may support communication protocols such as Ethernet (i.e. the IEEE 802.3 standard) and/or Wi-Fi® (i.e., the IEEE 802.11 standard), and/or other communication protocols or standards.

Figure 2:
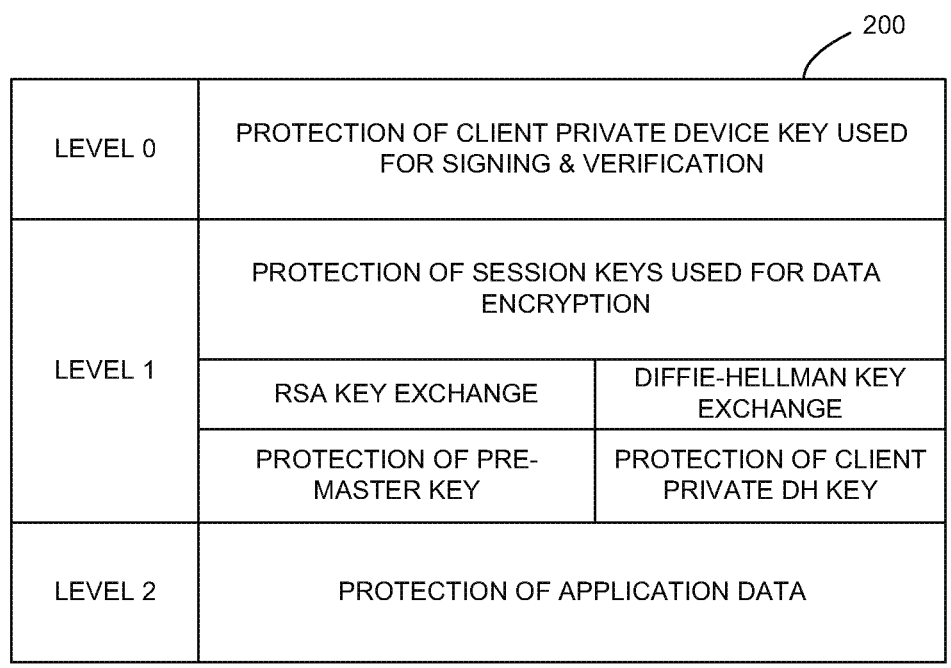
FIG. 2 is a block diagram of at least one embodiment of a security scheme for the system of FIG. 1.

The network 106 may be embodied as any number of various wired and/or wireless networks. For example, the network 106 may be embodied as or otherwise include a local area network (LAN), a wide area network (WAN), and/or a publicly accessible, global network such as the Internet. Additionally, the network 106 may include any number of additional devices to facilitate communication between the client device 102 and the server 104. As discussed above, in the illustrative embodiment, the client device 102 and the server 104 establish a SSL communication session over the network 106. However, other types of secure communication sessions may be established in other embodiments. Referring now to FIG. 2, as discussed in more detail below, the use of the security engine 110 of the client device 102 to perform the cryptographic functions and store keying data associated with the establishment of the secure communication session allows the system 100 to offer several different levels of security. The particular level of security used in the system 100 may depend upon various criteria such as the nature of the network 106, the importance of the data being transferred between the client device 102 and the server 104, and/or the like. For example, one illustrative security scheme 200 includes three different levels of security as shown in FIG. 2. At level 0 security, the client device 102 is configured to protect the client private device key (i.e., the security key 150), which is used for encrypting, signing, and verification functions as discussed in more detail below. At level 1 security, the client device 102 is configured to protect the session keys and related keys used for data encryption. For example, if an RSA key exchange is performed, the pre-master key and the master key (i.e., the session key) may be stored in the secure memory 114 of the security engine 110 of the SOC 112. Additionally, in some embodiments as discussed below, the master key may be stored in an encrypted or wrapped form (e.g., encrypted using the security key 150). In embodiments in which a Diffie-Hellman key exchange is used, the private Diffie-Hellman client key and/or shared secret key (i.e., the session key) may be stored in the secure memory 114 of the security engine 110 of the SOC 112. Again, in some embodiments, the private Diffie-Hellman client key and/or session key may be stored in an encrypted or wrapped form (e.g., encrypted using the security key 150).

Additionally, at level 2 security, the client device 102 may be configured to protect the data of the host application. For example, if the host application is being used to perform an e-commerce transaction, the bank account information used in such transaction may be encrypted using the security key 150 and stored in the secure memory 114. In this way, the bank account information is not available to the host application. Of course, it should be appreciated that, in other embodiments, security schemes having more or fewer security levels may be used.

Figure 3:
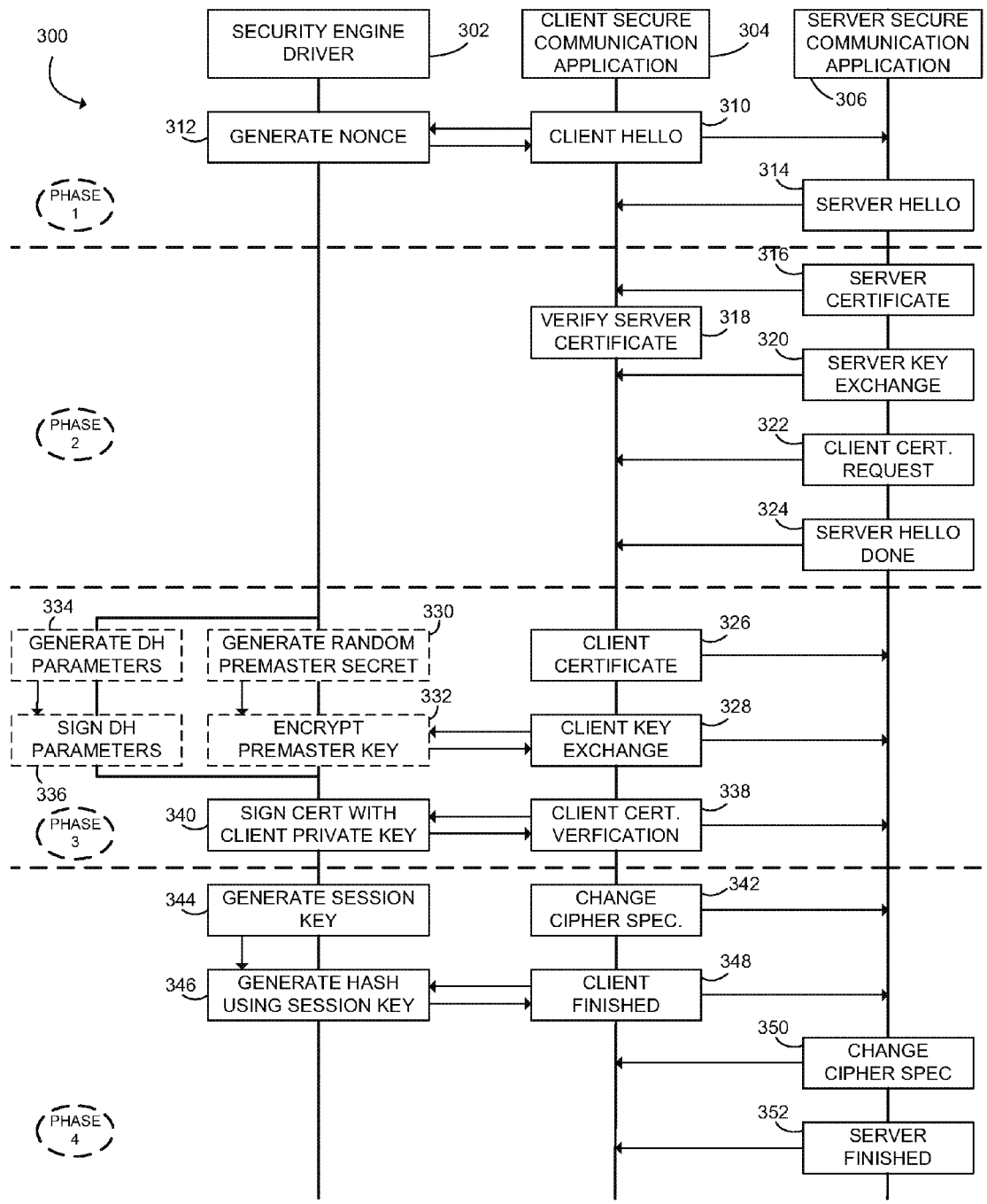
FIG. 3 is a simplified sequence diagram of at least one embodiment of a communication sequence of the client device and server of FIG. 1 to establish a secure communication session.

Referring now to FIG. 3, in operation, the client device 102 and the server 104 establish a secure communication session using the security engine 110 of the client device 102 to perform various cryptographic functions and store keying data therein. To do so, the client device 102 and server 104 may perform a handshake session as shown in the communication sequence 300 of FIG. 3. To establish the secure communication session, a security engine driver 302 of the security engine 110 communicates with a firmware of the security engine 110 and a client secure communication application 304 executed on the client device 102. The client secure communication application 304 also communicates with a corresponding server secure communication application 306 executed on the server 104.

The communication sequence 300 begins with block 310 in which the client secure communication application 304 sends a ClientHello message to the server secure communication application 306 to request the initiation, of a secure communication session. As discussed above, the secure communication session is a SSL session in the illustrative embodiment. To facilitate the request, the security engine driver 302 communicates with security engine 110 of the SOC 112 to request a random nonce from the security engine 110 in block 312. The security engine 110 may use any suitable random number-generating algorithm to generate the random nonce in block 312. The nonce is embodied as random or pseudo-random number intended to be used only once in cryptographic functions to thwart, for example, replay attacked. In the illustrative embodiment, the random nonce includes a 32-bit timestamp and a 28-byte random number. Of course, other numeric formats for the random nonce may be used in other embodiments. Regardless, it should be appreciated that because the random nonce is generated in the security engine 110, the generation and storage of the random nonce is protected compared to generation of the nonce at, for example, the application level.

The random nonce generated in block 312 is included in the ClientHello message sent to the server secure communication application 306 in block 310. Additionally, the ClientHello message may include a list of cipher suites, compression methods, and other cryptographic protocols or algorithms from which the server 104 may make a selection for use in establishing the secure communication session. In response to the secure communication session request, the server secure communication application 306 sends a Served-kilo message in block 314. The ServerHello message may be substantially similar to the ClientHello message. For example, in the illustrative embodiment, the ServerHello message includes a server random nonce generated by the server 104. Additionally, the ServerHello message includes the selection(s) of the cryptographic protocols and/or other options made by the server 104 from the list included in the ClientHello message. The ServerHello message completes the session initiation phase (Phase 1) of the illustrative handshake session.

In block 316, the server secure communication application 306 sends a server certificate to the client secure communication application 304. The server certificate, like the client certificate discussed below, is typically generated by a certification authority organization, which acts as a third-party verifier of the authentication of the server 104. The server certificate may include unique identifier or number assigned to the server 104 by the certification authority organization to verify the server 104 to other devices on the network 106. As such, in block 318, the client device 102 may verify the server certificate. In some embodiments, the client device 102 verifies the server certificate using a public certificate key issued by the certification authority organization. In such embodiments, the security engine 110 may store the public certificate key in the secure memory 114 in an unencrypted or encrypted state (e.g., using the security key 150).

To establish the secure communication session, the client device 102 and the server 104 perform a key exchange to establish a shared secret key (i.e., a master or session key) in each of the client device 102 and server 104. The client device 102 and the server 104 may use any appropriate key exchange algorithm to effect the establishment of the shared secret. In the illustrative embodiment, the key exchange may be embodied as an RSA key exchange or a Diffie-Hellman key exchange. In embodiments wherein a RSA key exchange is used, the server secure communication application 306 performs a server RSA key exchange in block 320. In such embodiments, the server 104 may generate a temporary RSA public/private key pair and send the RSA public key to the client device 102 in block 320. Such message may be signed by the server 104 and verified by the client device 102 using a public server key, which may be stored in the secure memory 114 as discussed above.

Alternatively, the server secure communication application 306 may perform a server Diffie-Hellman key exchange in block 320. In such embodiments, the server 104 selects or otherwise generates the Diffie-Hellman global values (e.g., a prime number and a primitive root of the prime number), generates a private and public Diffie-Hellman server key, and sends the Diffie-Hellman global values and public Diffie-Hellman server key to the client device 102 in block 320. Again, such message may be signed by the server 104 and verified by the client device 102 using a public server key.

In some embodiments, the sever secure communication application 306 may send a client certification request in block 322. If so, the request may specify the types of certificates accepted by the server 104 (e.g., the public key algorithm used), acceptable certificate authorities, and/or other certificate parameters. Subsequently, in block 324, the server secure communication application 306 sends a server completion message (a "ServerHelloDone" message) to the client secure communication application 304 to indicate that the server 104 has completed this phase of the handshake session. In the illustrative embodiment, no parameters or other data are required for the server completion message.

The ServerHelloDone message completes the server authentication and key exchange phase (Phase 2) of the illustrative handshake session.

After receiving the server completion message, the client secure communication application 304 initiates the client authentication and key exchange phase (Phase 3) of the handshake session by sending the client certificate in block 326. As discussed above, the client certificate is typically generated by the certification authority organization and may include a unique identifier or number assigned to the client device 102 by the certification authority organization to verify the client device 102 to other devices on the network 106. In some embodiments, the client certificate may be stored in the secure memory 114 of the security engine 110 of the SOC 112 in an unencrypted or encrypted state. Additionally, the client device 102 may use a private device key issued by the certification authority organization to sign the certificate prior to sending it to the server 104.

In block 328, the client secure communication application 304 performs a client key exchange. Again, the client device 102 and the server 104 may use any appropriate key exchange algorithm to effect the establishment of the shared secret as discussed above. In embodiments wherein an RSA key exchange is used, the security engine 110 of the SOC 112 of the client device 102 generates a random pre-master key in block 330. Illustratively, the pre-master key is embodied as a 48-byte random number, but other numeric formats may be used in other embodiments. In block 332, the pre-master key generated in block 330 is encrypted or otherwise wrapped using the server public key provided by the server in server authentication and key exchange phase (Phase 2). The encrypted pre-master key may be stored in the secure memory 114 of the security engine 110 of the SOC 112 and sent to the server 104 in block 328.

Alternatively, in embodiments wherein a Diffie-Hellman key exchange is used, the security engine 110 generates, in block 334, a private Diffie-Hellman client key and a public Diffie-Hellman client key using the Diffie-Hellman global values received from the server 104 in block 320. The private Diffie-Hellman client key may be embodied as a random value generated by the security engine 110, while the public Diffie-Hellman client key is generated by the security engine 110 using the Diffie-Hellman global values received from the server 104. The private. Diffie-Hellman client key may be stored in the secure memory 114 of the security engine 110. Of course, in some embodiments, the client device 102 may generate the Diffie-Hellman global values in block 334 and send such global values to the server 104 in block 328 to allow the server 104 to generate the public Diffie-Hellman server key based thereon. Regardless, in block 336, the security engine 110 of the SOC 112 signs the public Diffie-Hellman client key (and Diffie-Hellman global values if generated by the client device 102) in block 336 using the security key 150 or other private client key of the security engine 110. The signed Diffie-Hellman parameters may be further encrypted using the public server key and sent to the server 104 in block 328.

In some embodiments, the client secure communication application 304 may send a client certification verification message to the sever secure communication application 306 in block 338. To do so, the security engine 110 generates a hash code based on the preceding message and signs the hash code using the security key 150 of the security engine 110 in block 340. The client device 102 sends the signed hash code to the server 104 in block 338 as verification of the preceding message. It should be appreciated that such client certification verification messages may be used subsequent to any message sent to the server 104 from the client device 102 to provide an added level of security and verification to the secure communication session. The client certification verification message in block 338 completes the client authentication and key exchange phase (Phase 3) of the illustrative handshake session.

In block 342, the client secure communication application 304 sends a change cipher specification message to the server secure communication application 306 to inform the server 104 that subsequent communications will use the agreed-upon cipher (e.g., the generated session key). In block 344, the security engine 110 of the client device 102 generates a session key (i.e., the "master" key). In embodiments wherein an RSA key exchange is used, the security engine 110 generates the session key as a function of the pre-master key generated in block 330. To do so, the security engine 110 calculates a hash function of the pre-master key, the client random nonce generated in block 312, and the server random nonce received in block 314. Alternatively, in embodiments wherein a Diffie-Hellman key exchange is used, the security engine 110 generates the session key as a function of the Diffie-Hellman global values, the public Diffie-Hellman server key, and the private Diffie-Hellman client key. As discussed above, the session key is stored in the secure memory 114 of the security engine 110.

In block 346, the security engine 110 generates a hash code of the session key, which may include additional padding depending on the type of hash function used. The hash code of the session key is sent to the server 104 for verification in a client-finished message in block 348. The hash code of the session key may be encrypted by the security engine 110 using the public server key as discussed above.

In response to the client-finished message, the server 104 sends a change cipher specification message that acknowledges the use of the agreed-upon cipher (e.g., the session key) in block 350. The server 104 also sends a server-finished message in block 352 that includes a similar hash code of the session key for verification by the client device 102. Assuming that the client device 102 and the server 104 verify the hash code of the session key, the handshake session is complete and each of the client device 102 and server 104 have a shared secret session key that is used to encrypt and decrypt subsequent messages. Again, it should be appreciated that the security engine 110 of the SOC 112 of the client device 102 is used for all cryptographic functions and storage of sensitive keying data to provide hardware-based protection of the cryptographic keys and certificate keys used during the communication sequence 300.

Figure 4:
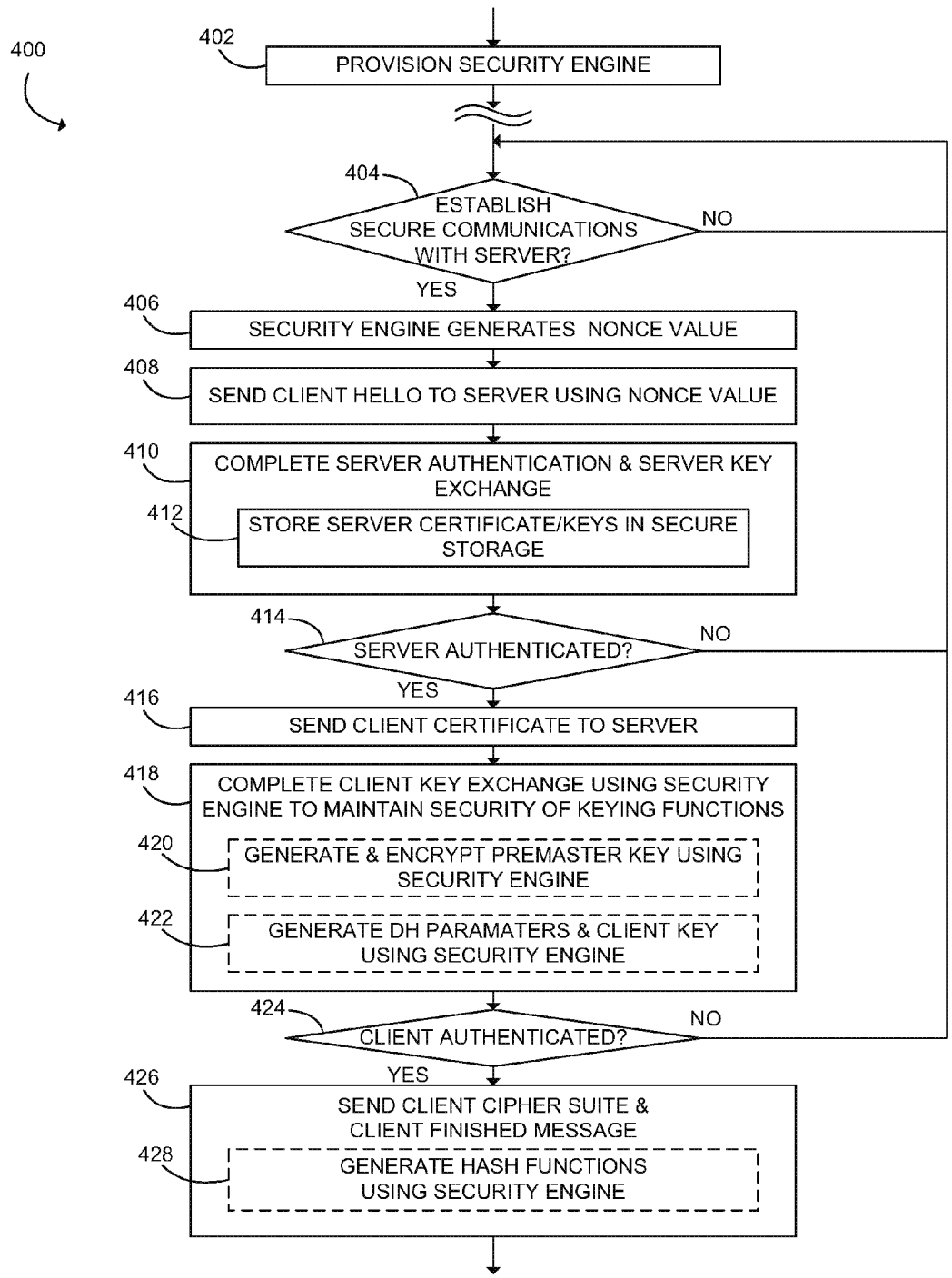
FIG. 4 is a simplified flow diagram of at least one embodiment of a method for establishing a secure communication session executed by the client device of FIG. 1.

Referring now to FIG. 4, in use, the client device 102 may execute a method 400 to establish a secure communication session with the server 104. The method 400 begins with block 402 in which the security engine 110 of the SOC 112 of the client device 102 is provisioned. To do so, in one embodiment, the security engine 110 receives a client device certificate, a private client device key, and a public certification key. The client device certificate, the private client device key, and the public certification key are typically generated by the certification authority organization, which acts as a third-party verifier of the authentication of the client device 102 as discussed above. The client device certificate may include a unique device identifier or number assigned to the client device 102 by the certification authority organization to verify the client device 102 to other devices on the network 106. The private client device key may be used by the client device 102 to sign the client device certificate so as to authenticate the client device 102 to other devices as discussed in more detail below. Conversely, the public certification key may be used by the client device 102 to verify certification of other devices on the network 106 by the certification authority organization.

The security engine 110 encrypts the private client device key using the security key 150 and stores the encrypted private client device key in the secure memory 114. The security engine 110 may also store the client device certificate and/or the public certification key in the secure memory 114. Additionally, in some embodiments, the security engine 110 may encrypt the client device certificate and/or the public certification key using the security key 150 stored in the security engine 110.

After the security engine 110 has been provisioned in block 402, the client device 102 determines whether to establish a secure communication session (e.g., an SSL session) with the server 104 in block 404. If so, in block 406, the security engine 110 generates a random nonce value. As discussed above, the security engine 110 may use any suitable random number-generating algorithm to generate the random nonce. In block 408, the client device 102 sends a request (a ClientHello message) to initiate the secure communication session to the server 104. The request includes the random nonce generated in block 406 along with a list of cipher protocols, compression methods, and/or other cryptographic choices from which the server 104 may select.

In block 410, the client device 102 completes the server authentication and server key exchange. In so doing, the client device 102 may receive a corresponding ServerHello message including a server random nonce, the server's 104 public key, and the server's 104 selection of cryptographic choices presented in the ClientHello message. As discussed above, the server random nonce, along with the client random nonce, is used to generate the session key. As such, the security engine 110 may store the server random nonce in the secure memory 114. Additionally, in some embodiments, the security engine 110 may store the server certificate and/or other keying data in the secure memory 114. For example, in embodiments wherein an RSA key exchange is used, the security engine 110 may store the public RSA key received from the server in the secure memory 114. Alternatively, in embodiments wherein a. Diffie-Hellman key exchange is used, the security engine 110 may store the Diffie-Hellman global values and/or public Diffie-Hellman server key in the secure memory 114.

In block 414, the client 104 determines whether the server 104 is successfully authenticated. If not, the method 400 loops back to block 404 in which the client device 102 may reattempt to establish a secure communication session with the server 104. However, if the server 104 is successfully authenticated, the method 400 advances to bock 416 in which the client device 102 sends the server 104 the client certificate. If the client certificate has been encrypted (e.g., using the secure key 150), the security engine 110 decrypts the client certificate and signs the client certificate using the private client device key.

In block 418, the client 104 completes the client key exchange using the security engine 110 to maintain the security of the keying functions. For example, if a RSA key exchange was selected, the security engine 110 generates the pre-master key and encrypts the pre-master key using the server public key received in block 410 prior to sending the encrypted pre-master key to the server 104 in block 420. Alternatively, if a Diffie-Hellman key exchange was selected, the security engine 110 generates the public and private Diffie-Hellman client keys using the Diffie-Hellman global values received from the server 104 in block 410. The security engine 110 may sign the public Diffie-Hellman client key using the security key 150 or the public client device key provisioned in block 402. The client device 102 sends the signed public Diffie-Hellman client key to the server 104 in block 422. The keys and related keying data generated during the client key exchange may be stored in the secure memory 114 in an encrypted state (using the security key 150) or an unencrypted state.

In block 424, the client device 102 determines whether the client device 102 has been successfully authenticated by the server 104. If not, the method 400 loops back to block 404 in which the client device 102 may reattempt to establish a secure communication session with the server 104. However, if the client device 102 is successfully authenticated, the method 400 advances to bock 426 in which the client device 102 confirms the cipher suite with the server 104 by informing the server 104 that subsequent messages will use the agreed-upon cryptographic protocols. In so doing, the security engine 110 may generate the master or session key. To do so, in embodiments wherein an RSA key exchange is used, the security engine 110 calculates a hash function of the pre-master key, the client random nonce generated in block 406, and the server random nonce received in block 410. Alternatively, in embodiments wherein a Diffie-Hellman key exchange is used, the security engine 110 generates the session key as a function of the Diffie-Hellman global values, the public Diffie-Hellman server key, and the private Diffie-Hellman client key. Once generated, the security engine 110 of the SOC 112 may store the session key in the secure memory 114 of the security engine 110. In some embodiments, the session key may be encrypted using the security key 150 while stored in the secure memory 114.

In block 428, the security engine 110 generates a hash function of the session key, which is sent to the server 104 for verification in a client finished message. Again, the hash code of the session key may be encrypted by the security engine 110 using the public server key as discussed above. In response, the server 104 confirms the cipher suite with the client device 102 to acknowledge the agreed-upon cipher (e.g., the session key). The server 104 also sends a server finished message that includes a similar hash code of the session key for verification by the client device 102. Assuming that the client device 102 and the server 104 verify the hash code of the session key, the handshake session is complete and each of the client device 102 and server 104 have a shared secret session key that is used to encrypt and decrypt subsequent messages.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

The invention claimed is:

1. A system-on-a-chip apparatus comprising:
a system-on-a-chip comprising a security engine that is separate from a processor core of the system-on-a-chip and has a secure memory accessible only by the security engine, wherein the secure memory includes a security key that was encoded in the secure memory during a manufacturing process of the system-on-a-chip, the security engine to:
generate a random nonce for initiating a request for a secure communication session with a remote server over a network using the nonce;
perform a cryptographic key exchange with the remote server;
generate a symmetric session key, based on the cryptographic key exchange, to encrypt messages sent to the remote server and decrypt messages received from the remote server during the secure communication session;
encrypt the symmetric session key based on the security key; and
store the encrypted session key in the secure memory,
the system-on-a-chip to establish the secure communication session with the remote server over the network using the session key.

2. The system-on-a-chip apparatus of claim 1, wherein the security engine is further to receive a server nonce from the remote server in a response message to the request for the secure communication session, the response message including a server nonce and store the server nonce in the secure memory.

3. The system-on-a-chip apparatus of claim 1, wherein the security engine is further to generate a pre-master key, encrypt the pre-master key using the security key of the security engine, and send the encrypted pre-master key to the remote server.

4. The system-on-a-chip apparatus of claim 3 wherein the security engine is further to wrap the pre-master key using a server public key and store the wrapped pre-master key in the secure memory.

5. The system-on-a-chip apparatus of claim 3, wherein the security engine is further to:
generate the session key as a function of the pre-master key; and
calculate a hash function as a function of the random nonce generated by the security engine and a nonce received from the remote server.

6. The system-on-a-chip apparatus of claim 1, wherein the security engine is further to generate a public Diffie-Hellman client key and a private Diffie-Hellman client key, sign the public Diffie-Hellman client key using the security key of the security engine, and send the signed public Diffie-Hellman key to the remote server.

7. The system-on-a-chip apparatus of claim 6, wherein the security engine is further to receive a public Diffie-Hellman server key from the remote server and generate the session key as a function of the private Diffie-Hellman client key and the public Diffie-Hellman server key.

8. The system-on-a-chip apparatus of claim 1, wherein the security engine is further to receive Diffie-Hellman global values and a public Diffie-Hellman server key from the remote server and store at least one of the Diffie-Hellman global values and the public Diffie-Hellman server key in the secure memory.

9. A method comprising:
generating a random nonce in a security engine that is separate from a processor core of a system-on-a-chip of a client device;
initiating, using the client device, a request for a secure communication session with a remote server over a network, the request including the random nonce;
performing a cryptographic key exchange, using the security engine of the system-on-a-chip, with the remote server;
generate a symmetric session key to encrypt messages sent to the remote server and decrypt messages received from the remote server during the secure communication session;

encrypting the session key based on a security key that was encoded in a secure memory of the security engine during a manufacturing process of the system-on-a-chip;

storing the encrypted session key in the secure memory of the security engine of the system-on-a-chip; and establishing, using the client device, the secure communication session with the remote server using the session key.

10. The method of claim 9, wherein initiating a request for a secure communication session comprises sending a ClientHello message, including the nonce, to the remote server; and further comprising:

receiving a ServerHello message from the remote server, the ServerHello message including a server nonce; and storing the server nonce in the secure memory of the security engine of the system-on-a-chip.

11. The method of claim 9, wherein performing the cryptographic key exchange with the remote server comprises:

generating a pre-master key in the security engine;

encrypting the pre-master key using the security key of the security engine; and sending the encrypted pre-master key to the remote server.

12. The method of claim 11, further comprising:

wrapping the pre-master key in the security engine of the system-on-a-chip using a server public key, and storing the wrapped pre-master key in the secure memory of the security engine of the system-on-a-chip.

13. The method of claim 11, wherein performing the cryptographic key exchange with the remote server comprises generating the session key in the security engine of the system-on-a-chip as a function of the pre-master key.

14. The method of claim 13, wherein generating the session key in the security engine comprises calculating, using the security engine of the system-on-a-chip, a hash function as a function of the random nonce generated by the security engine and a nonce received from the remote server.

15. The method of claim 9 wherein performing the cryptographic key exchange with the remote server comprises:

generating, in the security engine of the system-on-a-chip, a public Diffie-Hellman client key and a private Diffie-Hellman client key;

signing the public Diffie-Hellman client key using the security key of the security engine of the system-on-a-chip;

sending the signed public Diffie-Hellman key to the remote server;

receiving a public Diffie-Hellman server key from the remote server; and generating, in the security engine of the system-on-a-chip, the session key as a function of the private Diffie-Hellman client key and the public Diffie-Hellman server key.

16. The method of claim 9, further comprising:

generating, in the security engine of the system-on-a-chip, a hash code of a preceding message sent from the client to the remote server;

signing the hash code using the security key stored in the secure memory of the security engine; and sending a client certificate verification message to the remote server, the client certificate verification message including the signed hash code.

17. One or more non-transitory machine-readable storage media comprising a plurality of instructions stored thereon that, in response to execution by a computing device, cause the computing device to:

generate a random nonce in a security engine that is separate from a processor core of a system-on-a-chip of the computing device;

initiate a request for a secure communication session with a remote server over a network, the request including the random nonce;

perform a cryptographic key exchange, using the security engine of the system-on-a-chip, with the remote server;

generate, based on the cryptographic key exchange, a symmetric session key to encrypt messages sent to the remote server and decrypt messages received from the remote server during the secure communication session;

encrypt the session key based on a security key that was encoded in a secure memory of the security engine during a manufacturing process of the system-on-a-chip;

store the session key in the secure memory of the security engine of the system-on-a-chip; and establish the secure communication session with the remote server using the session key.

18. The one or more non-transitory machine-readable storage media of claim 17, wherein to initiate a request for a secure communication session comprises to send a ClientHello message, including the nonce, to the remote server; and wherein the plurality of instructions further cause the computing device to: receive a ServerHello message from the remote server, the ServerHello message including a server nonce; and store the server nonce in the secure memory of the security engine of the system-on-a-chip.

19. The one or more non-transitory machine-readable storage media of claim 17, wherein to perform the cryptographic key exchange with the remote server comprises to:

generate a pre-master key in the security engine;

encrypt the pre-master key using the security key of the security engine; and send the encrypted pre-master key to the remote server.

20. The one or more non-transitory machine-readable storage media of claim 19, wherein the plurality of instructions further cause the computing device to:

wrap the pre-master key in the security engine of the system-on-a-chip with a server public key, and store the wrapped pre-master key in the secure memory of the security engine of the system-on-a-chip.

21. The one or more non-transitory machine-readable storage media of claim 19, wherein to perform the cryptographic key exchange with the remote server comprises to generate the session key in the security engine of the system-on-a-chip as a function of the pre-master key.

22. The one or more non-transitory machine-readable storage media of claim 21, wherein to generate the session key in the security engine comprises to calculate, using the security engine of the system-on-a-chip, a hash function as a function of the random nonce generated by the security engine and a nonce received from the remote server.

23. The one or more non-transitory machine-readable storage media of claim 17, wherein to perform the cryptographic key exchange with the remote server comprises to:

generate, in the security engine of the system-on-a-chip, a public Diffie-Hellman client key and a private Diffie-Hellman client key;

sign the public Diffie-Hellman client key using the security key of the security engine of the system-on-a-chip;

send the signed public Diffie-Hellman key to the remote server;

receive a public Diffie-Hellman server key from the remote server; and generate, in the security engine of the system-on-a-chip, the session key as a function of the private DiffieHellman client key and the public Diffie-Hellman server key.

24. The system-on-a-chip apparatus of claim 1, wherein the security engine is communicatively coupled to the processor core through an interconnect of the system-on-a-chip.

* * * * *